US011661862B2

(12) United States Patent
Adhiachari et al.

(10) Patent No.: US 11,661,862 B2
(45) Date of Patent: May 30, 2023

(54) OIL LIFE OF OIL IN A GEARBOX OF AN AIR TURBINE STARTER

(71) Applicant: Unison Industries, LLC, Jacksonville, FL (US)

(72) Inventors: Subramani Adhiachari, Bangalore (IN); Prasant Bilaiya, Bangalore (IN); Shiloh Montegomery Meyers, Miamisburg, OH (US); Sharad Pundlik Patil, Bangalore (IN)

(73) Assignee: Unison Industries, LLC, Jacksonville, FL (US)

( * ) Notice: Subject to any disclaimer, the term of this patent is extended or adjusted under 35 U.S.C. 154(b) by 0 days.

(21) Appl. No.: 17/321,998

(22) Filed: May 17, 2021

(65) Prior Publication Data

US 2021/0388736 A1    Dec. 16, 2021

(51) Int. Cl.
  *F01D 19/02* (2006.01)
  *F02C 7/277* (2006.01)
  (Continued)

(52) U.S. Cl.
  CPC ............... *F01D 19/02* (2013.01); *B64F 5/40* (2017.01); *F01D 25/18* (2013.01); *F02C 7/06* (2013.01); *F02C 7/277* (2013.01); *F02C 7/36* (2013.01); *F16H 57/0405* (2013.01); *B64D 2045/0085* (2013.01); *F01M 2250/60* (2013.01); *F01M 2250/64* (2013.01); *F05D 2220/323* (2013.01); *F05D 2230/72* (2013.01); *F05D 2260/4031* (2013.01); *F05D 2260/80* (2013.01); *F05D 2260/81* (2013.01); *F05D 2260/82* (2013.01); *F05D 2260/85* (2013.01); *F05D 2260/98* (2013.01); *F05D 2270/11* (2013.01); *F05D 2270/303* (2013.01); *F05D 2270/304* (2013.01);
  (Continued)

(58) Field of Classification Search
  CPC ........ F01D 19/02; F01D 25/18; F01D 21/003; B64F 5/40; B64D 2045/0085; F02C 7/06; F02C 7/277; F02C 7/36; F05D 2220/323; F05D 2260/4031; F05D 2260/80; F05D 2260/81; F05D 2260/82; F05D 2260/85; F05D 2260/98; F05D 2270/11; F05D 2270/303; F05D 2270/304; F05D 2270/313; F05D 2270/44; F16N 2200/00; F16N 2210/02; F16N 2210/08; F16N 2250/11; F16N 2250/16; F16H 57/0405; F01M 2250/60; F01M 2250/64
  See application file for complete search history.

(56) References Cited

U.S. PATENT DOCUMENTS 7,521,945 B2   4/2009 Hedges et al.
8,190,394 B2   5/2012 Davis et al.
(Continued)

FOREIGN PATENT DOCUMENTS

WO   2005111949 A1   11/2005

*Primary Examiner* — Loren C Edwards
(74) *Attorney, Agent, or Firm* — McGarry Bair PC

(57) ABSTRACT

A system and method for predicting a remaining oil life of oil in a gearbox of an air turbine starter of a vehicle. The method includes generating a temperature data, generating an environmental data set by an environmental sensor, predicting a remaining oil life based on the temperature data set and the environmental data set and scheduling a maintenance event in response to the prediction of the remaining oil life.

19 Claims, 7 Drawing Sheets

(51) Int. Cl.

| | | |
|---|---|---|
| *F02C 7/36* | (2006.01) | |
| *B64F 5/40* | (2017.01) | |
| *F02C 7/06* | (2006.01) | |
| *F01D 25/18* | (2006.01) | |
| *F16H 57/04* | (2010.01) | |
| *B64D 45/00* | (2006.01) | |

(52) U.S. Cl.
CPC .... *F05D 2270/313* (2013.01); *F05D 2270/44* (2013.01); *F16N 2200/00* (2013.01); *F16N 2210/02* (2013.01); *F16N 2210/08* (2013.01); *F16N 2250/11* (2013.01); *F16N 2250/16* (2013.01)

(56) References Cited

U.S. PATENT DOCUMENTS

| | | |
|---|---|---|
| 9,746,452 B2 | 8/2017 | Worden et al. |
| 10,233,773 B2 | 3/2019 | Schwarz et al. |
| 10,260,388 B2 | 4/2019 | Potyrailo et al. |
| 2012/0025529 A1* | 2/2012 | Davis ................. F03D 80/70 |
| | | 702/179 |
| 2012/0143436 A1 | 6/2012 | Cornet et al. |
| 2014/0318223 A1* | 10/2014 | O'Donnell ............ F01M 11/10 |
| | | 73/53.07 |
| 2017/0138922 A1* | 5/2017 | Potyrailo ............ G01M 13/021 |
| 2018/0195437 A1 | 7/2018 | Stephan et al. |
| 2018/0252362 A1* | 9/2018 | Guo ...................... F16N 29/04 |
| 2018/0347669 A1* | 12/2018 | Nayak ................... F16H 48/06 |
| 2022/0170819 A1* | 6/2022 | Coupard .................. F02C 7/06 |

* cited by examiner

OIL LIFE OF OIL IN A GEARBOX OF AN AIR TURBINE STARTER

CROSS REFERENCE TO RELATED APPLICATIONS

This application claims priority to Indian Provisional Patent Application No. 202011024773, filed Jun. 12, 2020, which is incorporated herein by reference in its entirety.

TECHNICAL FIELD

The present disclosure relates generally to a system and a method for predicting the oil life in a gearbox of an air turbine starter.

BACKGROUND

Costs can be incurred by owners of machines or vehicles powered by air turbine engines due to periods of unavailability, or down-time. Down-time is sometimes related to air turbine engine assembly down-time. The air turbine engine assembly includes the air turbine engine and engine accessories, such as a starter or a generator. To reduce the likelihood or frequency of downtime, preventive maintenance programs have been implemented.

Preventive maintenance is periodically performed on engine accessories based on wear rates or usage rates. Engine accessories experience or endure a variety of loads, weather, and other factors that inevitably mean that engine accessories or components of engine accessories will wear at differential rates than others. Worn components can lead to inefficient operation of the engine accessory or down-time.

Conventional methods require data regarding wear and rates that may be only forensically known, either after expensive operational failures or expensive testing programs.

BRIEF DESCRIPTION

Aspects and advantages of the disclosure will be set forth in part in the following description, or may be obvious from the description, or may be learned through practice of the disclosure.

In one aspect, the disclosure relates to a method for predicting a remaining oil life of oil in a gearbox of an air turbine starter of a vehicle, the method including generating a temperature data set by sensing a temperature from at least one temperature sensor external of the gearbox, generating an environmental data set by an environmental sensor, the environmental sensor adapted to sense an environmental condition relative to the air turbine starter, predicting, by a controller module, a remaining oil life based on the temperature data set and the environmental data set, and scheduling a maintenance event in response to the prediction of the remaining oil life.

In another aspect, the disclosure relates to a system for determining an oil quality for oil of an air turbine starter that includes at least one temperature sensor adapted to sense a temperature external of a gearbox, and a controller module configured to estimate a model of oil quality based on the sensed temperature, and to schedule a maintenance event in response to the estimated model of oil quality.

In yet another aspect, the disclosure relates to a method for predicting a remaining oil life in a gearbox of an air turbine starter, the method including generating an oil temperature data set by sensing a temperature, from a temperature sensor external of the gearbox, that is indicative of a temperature of the oil within the gearbox, generating an environmental data set comprising at least one of average ambient air temperatures during takeoff or average cruising altitudes, generating an operational data set comprising at least one of total number of starting cycles for the starter, rpm during starting, or duration of air starter operation, predicting a remaining oil life by inputting the oil temperature, environmental, and operational data sets, along with an oil type, into a controller module, and operating a starting cycle of the air turbine starter based on the predicted remaining oil life.

These and other features, aspects and advantages of the present disclosure will become better understood with reference to the following description and appended claims. The accompanying drawings, which are incorporated in and constitute a part of this specification, illustrate aspects of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended FIGs. in which.

DESCRIPTION

Figure 1:
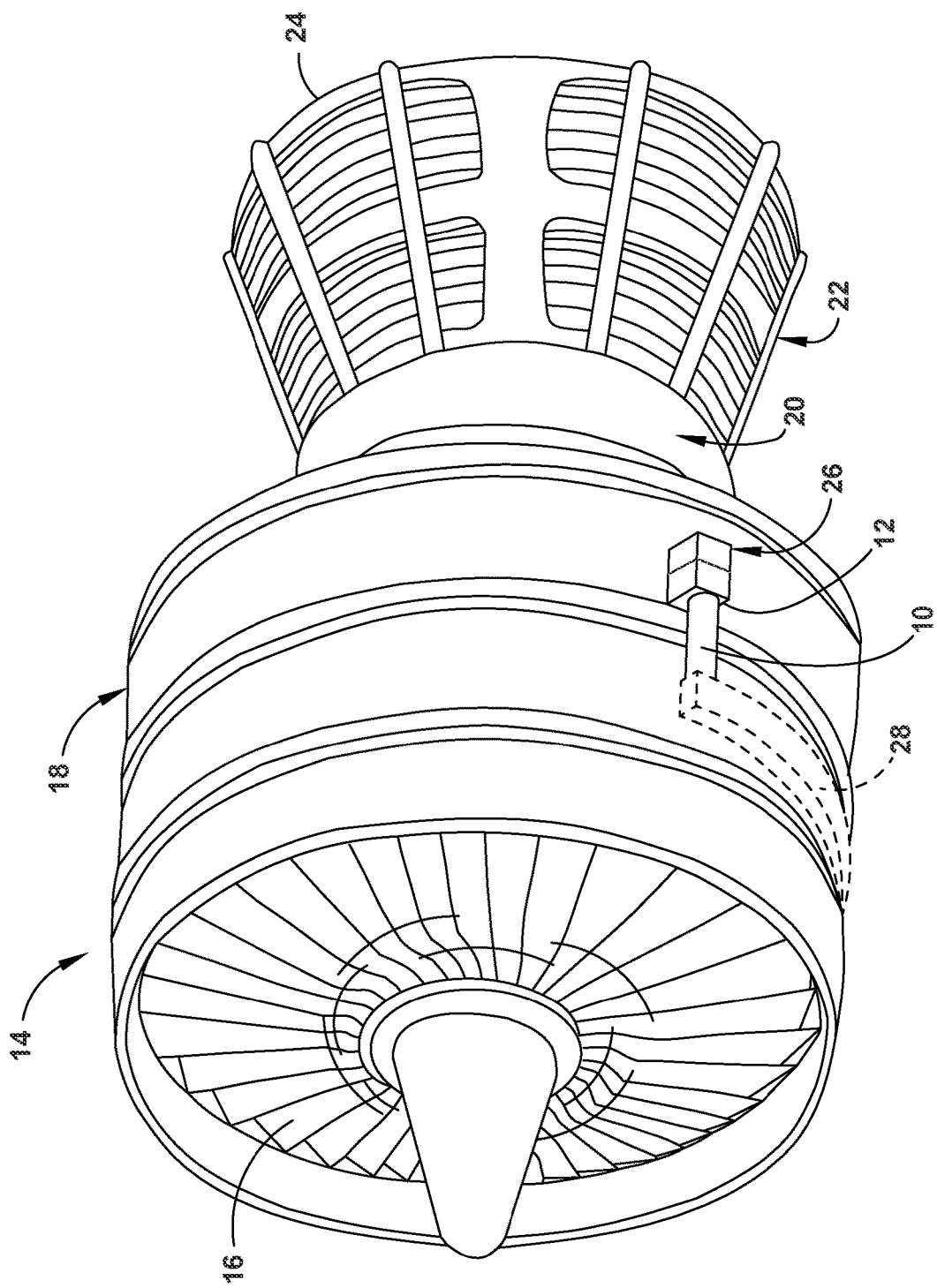
FIG. 1 is a perspective view of a turbine engine with an air turbine starter, in accordance with various aspects described herein.

The aspects of the present disclosure are directed to a system and method of predicting the oil life of oil in a gearbox of an air turbine engine starter. As used herein, the term "oil life" is one or more values indicative of a quality of oil life. By way of non-limiting example, oil life can be given as a numerical value, a comparison between values (e.g. greater than, less than, true or false indications, etc.) range of values, or as a model of oil quality that can indicate a point at which the oil will no longer perform as desired. That is, the oil life indicates a span between the oil being new and a point at which the performance of the oil has reach a minimum threshold of actual or expected performance. Oil life can be given in number of cycles, number of miles, number of run hours, number of weeks, or percentage. Therefore, the term, "remaining oil life" is the number of cycles, number of miles, number of run hours, number of weeks, or percentage of the oil life that can occur before the oil has reached a minimum threshold of performance.

While oil life in a gearbox of an air turbine engine starter is primarily discussed, it is understood that aspects of the disclosure described herein are not so limited and can have general applicability within engines or vehicles, and can be used to provide benefits in industrial, commercial, and residential applications for any "life" of an extinguishable product. As used herein, the term "extinguished life" indicates that one or more components have reached a predetermined threshold of minimum performance, such that replacement, repair, or maintenance is recommended. "Extinguished life" does not imply failure or expected failure of a component, or alternatively, can define an end of life ahead of an expected failure of the component.

An estimated model of oil quality can be developed to determine the oil life. The term, "model" is a representation an object or a process that is used to describe, explain, or predict one or more phenomena related to the object or process that cannot be experienced directly. By way of non-limiting example, the estimated model of oil quality can include a set of values, data, instructions, ranges, or the like, representative of an example oil quality that is dynamic or predetermined. By further example, the dynamic estimated model of oil quality can be updated continuously based on data or information, such as, but not limited to, a sensed temperature communicated from the at least one starter sensor. Oil quality can include, but is not limited to, one or more of the density of the oil, the pH or acidity of the oil, the oxidation of the oil, the molecular content of the oil, or the viscosity of the oil.

The predetermined estimated model of oil quality can be determined before a cycle of operation of the air turbine starter. In another non-limiting example, the predetermined estimated model of oil quality can be based on testing or other data accumulation methods and can be specific to a type of oil or air turbine starter. In yet another non-limiting example, the predetermined estimated model of oil quality can be used as a comparison to the dynamic estimated model of oil quality. In another non-limiting example, information, such as a sensed temperature communicated from the at least one starter sensor, can be compared to one or more portions of the predetermined estimate model of oil quality to determine a remaining oil life, an oil quality value, or a maintenance event.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

Additionally, as used herein, a "controller" or "controller module" can include a component configured or adapted to provide instruction, control, operation, or any form of communication for operable components to affect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient, volatile or non-transient, or non-volatile memory. Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein.

Additionally, as used herein, elements being "electrically connected," "electrically coupled," or "in signal communication" can include an electric transmission or signal being sent, received, or communicated to or from such connected or coupled elements. Furthermore, such electrical connections or couplings can include a wired or wireless connection, or a combination thereof.

Also, as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor as defined above, and the controller module or processor can perform processing on the value to determine a representative value or an electrical characteristic representative of said value.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting on an embodiment, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Referring to FIG. 1, an air turbine starter (ATS) 10 is coupled to an accessory gearbox (AGB) 12, also known as a transmission housing, and together are schematically illustrated as being mounted to a turbine engine 14 such as a gas turbine engine. The turbine engine 14 comprises an air intake with a fan 16 that supplies air to a high-pressure compression region 18. The air intake with a fan 16 and the high-pressure compression region collectively are known as the 'cold section' of the turbine engine 14 upstream of the combustion. The high-pressure compression region 18 provides a combustion chamber 20 with high pressure air. In the combustion chamber, the high-pressure air is mixed with fuel and combusted. The hot and pressurized combusted gas passes through a high-pressure turbine region 22 and a low-pressure turbine region 24 before exhausting from the turbine engine 14. As the pressurized gases pass through the high-pressure turbine (not shown) of the high-pressure turbine region 22 and the low-pressure turbine (not shown) of the low-pressure turbine region 24, the turbines extract rotational energy from the flow of the gases passing through the turbine engine 14. The high-pressure turbine of the high-pressure turbine region 22 can be coupled to the compression mechanism (not shown) of the high-pressure compression region 18 by way of a shaft to power the compression mechanism. The low-pressure turbine can be coupled to the fan 16 of the air intake by way of a shaft to power the fan 16.

The AGB 12 is coupled to the turbine engine 14 at either the high pressure or low-pressure turbine region 22, 24 by way of a mechanical power take-off 26. The mechanical power take-off 26 contains multiple gears and means for mechanical coupling of the AGB 12 to the turbine engine 14. During starting operating conditions, the ATS 10 can utilize a source of energy to drive kinetic energy or power from the ATS 10 to initiate self-sustaining combustion or "normal running" operating conditions of the turbine engine 14. For example, in one non-limiting example, a source of pressurized air can be utilized to begin rotation of a set of rotors of the turbine engine 14 by way of the AGB 12 and mechanical power take-off 26, until a rotational speed of the set of rotors is high enough to be able to initiate a self-sustaining combustion cycle of turbine engine operation. Under normal running operating conditions, the mechanical power take-off 26 translates power from the turbine engine 14 to the AGB 12 to power accessories of the aircraft for example but not limited to fuel pumps, electrical systems, and cabin environment controls. The ATS 10 can be mounted on the outside of either the air intake region containing the fan 16 or on the core near the high-pressure compression region 18. Optionally, an air intake conduit 28 can couple to the ATS 10. The air intake conduit 28 can supply the ATS 10 with pressurized air.

Figure 2:
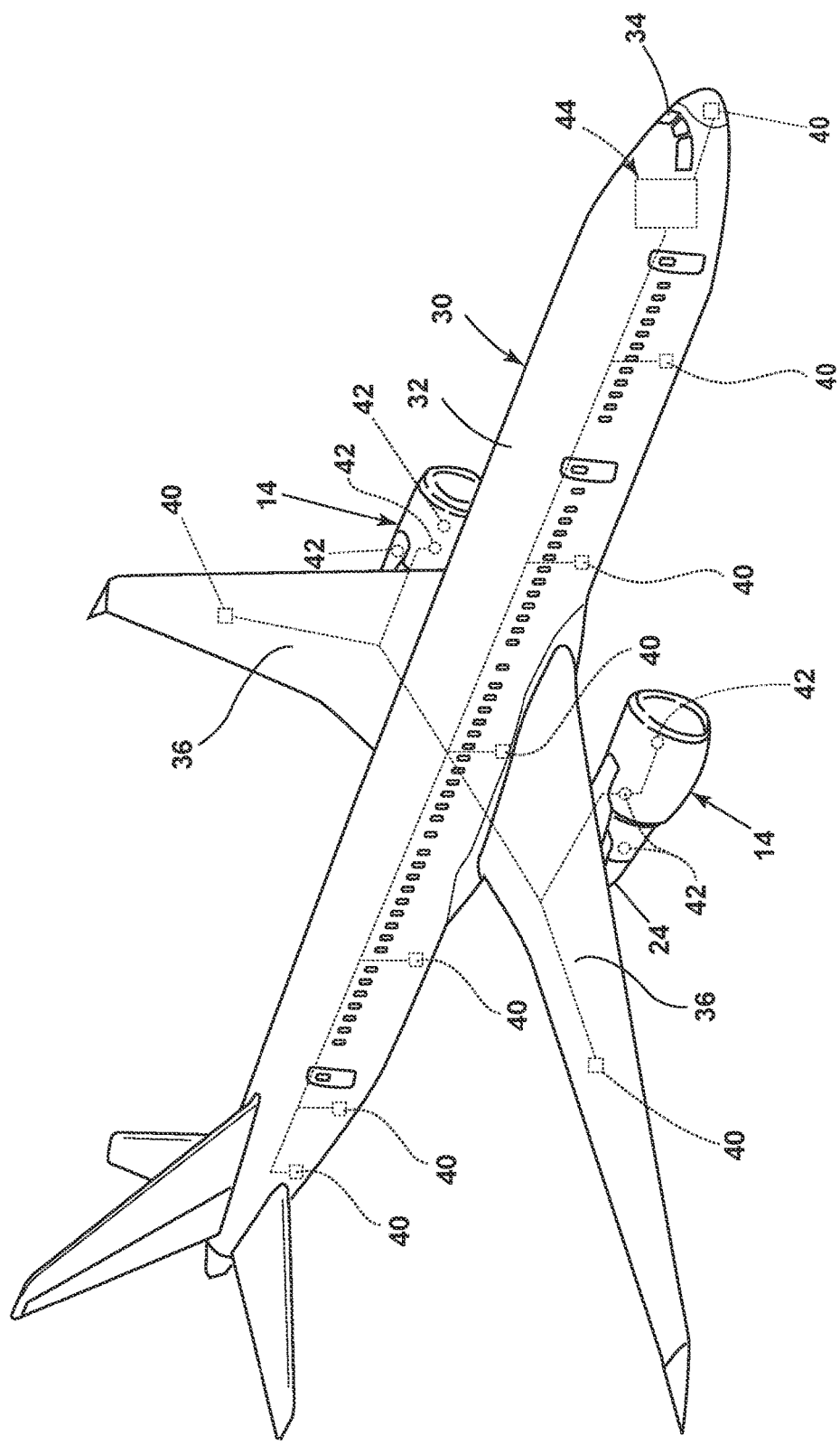
FIG. 2 is a perspective view of an aircraft with the turbine engine of FIG. 1, in accordance with various aspects described herein.

FIG. 2 illustrates, by way of non-limiting example, the vehicle that the turbine engine 14 is coupled to is an aircraft 30. The turbine engine 14 can be a turbofan engine or it could be a variety of other known turbine engines such as a turboprop or turboshaft. The turbine engine can also have an afterburner that burns an additional amount of fuel downstream of the low-pressure turbine region 24 to increase the velocity of the exhausted gases, and thereby increasing thrust.

The aircraft 30 includes one or more turbine engines 14, a fuselage 32 with a cockpit 34, and one or more turbine engines 14 coupled to the fuselage 32 directly or, as shown, by way of wing assemblies 36 extending outward from the fuselage 32.

The aircraft 30 can include at least one aircraft sensor 40 mounted to any portion of the fuselage 32 or wing assemblies 36. By way of non-limiting example, the at least one aircraft sensor 40 can include at least one aircraft temperature sensor. The at least one aircraft temperature sensor can provide information related to, but not limited to, the temperature of at least one component of the aircraft 30 or the temperature of the air flowing at, through, or around one or more respective portions of the aircraft 30. Additionally, or alternatively, the at least one aircraft sensor 40 can include an environmental sensor adapted to sense an environmental condition relative to the aircraft or vehicle. The environmental sensor can be, by way of non-limiting example, a humidity sensor, global positioning system (GPS), pressure sensor, altimeter, ambient air temperature sensor, strain gauge, accelerometer, or photodetector.

The turbine engine 14 can include at least engine sensor 42. By way of non-limiting example, the at least one engine sensor 42 can be at least one engine temperature sensor. The at least on engine temperature sensor can be configured to provide or generate information related to the temperature of at least one respective component of the turbine engine 14 or the temperature of the air-flow through one or more portions of the turbine engine 14. Additionally, or alternatively, the at least one engine sensor 42 can include an environmental sensor adapted to sense an environmental condition relative to the engine or vehicle. The environmental sensor can include, by way of non-limiting example, a humidity sensor, global positioning system (GPS), pressure sensor, altimeter, ambient air temperature sensor, strain gauge, accelerometer, or photodetector.

The at least one aircraft sensor 40 or the at least one engine sensor 42 can be in communication with a controller module 44, which can further include a processor and memory. While only a single controller module 44 has been illustrated, it is contemplated that any number of controller modules 44 can be included in the aircraft 30. In such an instance, the controller module 44 can also be connected with other controller modules of the aircraft 30. The controller module 44 can include or be associated with any suitable number of individual microprocessors, power supplies, storage devices, interface cards, auto flight systems, flight management computers, other standard components, or the like.

While illustrated as located in or near the cockpit 34, it is contemplated that the controller module 44 can be located in any portion of the aircraft 30 including, but not limited to, one or more turbine engines 14, the ATS 10, the wing assemblies 36, or other portions of the fuselage 32.

Figure 3:
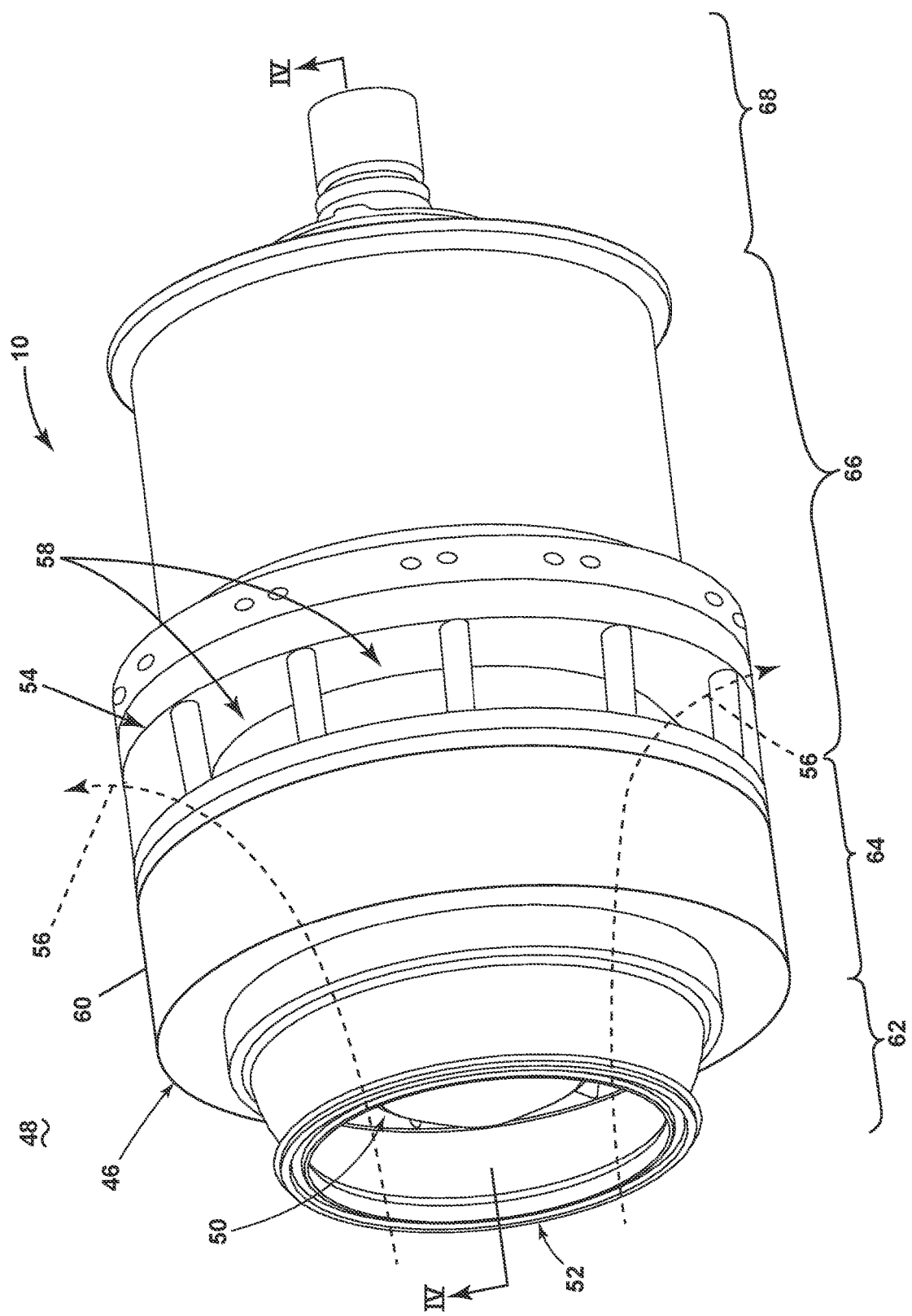
FIG. 3 is an isometric view of the air turbine starter of the turbine engine of FIG. 1 in accordance with various aspects described herein.

Referring now to FIG. 3, an example of the ATS 10 is shown. Generally, the ATS 10 includes a housing 46 defining an exterior 48 and an interior 50 having a primary inlet 52 and a primary outlet 54. A primary air flow path 56, illustrated schematically with an arrow, extends between the primary inlet 52 and the primary outlet 54 for communicating a flow of fluid, including, but not limited to gas, compressed air, or the like, there through. The primary outlet 54 can include a plurality of circumferentially arranged openings 58 in a peripheral wall 60 of the housing 46. In this configuration, the primary inlet 52 is an axial inlet and the primary outlet 54 is a radial or circumferential outlet alone the periphery of the housing 46.

The housing 46 can be made up of two or more parts that are combined together or can be integrally formed as a single piece. In the depicted aspects of the disclosure, the housing 46 of the ATS 10 generally defines, in an axial series arrangement, an inlet assembly 62, a turbine section 64, a gearing/clutch section 66, and a drive section 68. The ATS 10 can be formed by any materials and methods, including, but not limited to, additive manufacturing or die-casting of high strength and lightweight metals such as aluminum, stainless steel, iron, or titanium. The housing 46 and the gearing/clutch section 66 can be formed with a thickness sufficient to provide adequate mechanical rigidity without adding unnecessary weight to the ATS 10 and, therefore, the aircraft.

Figure 4:
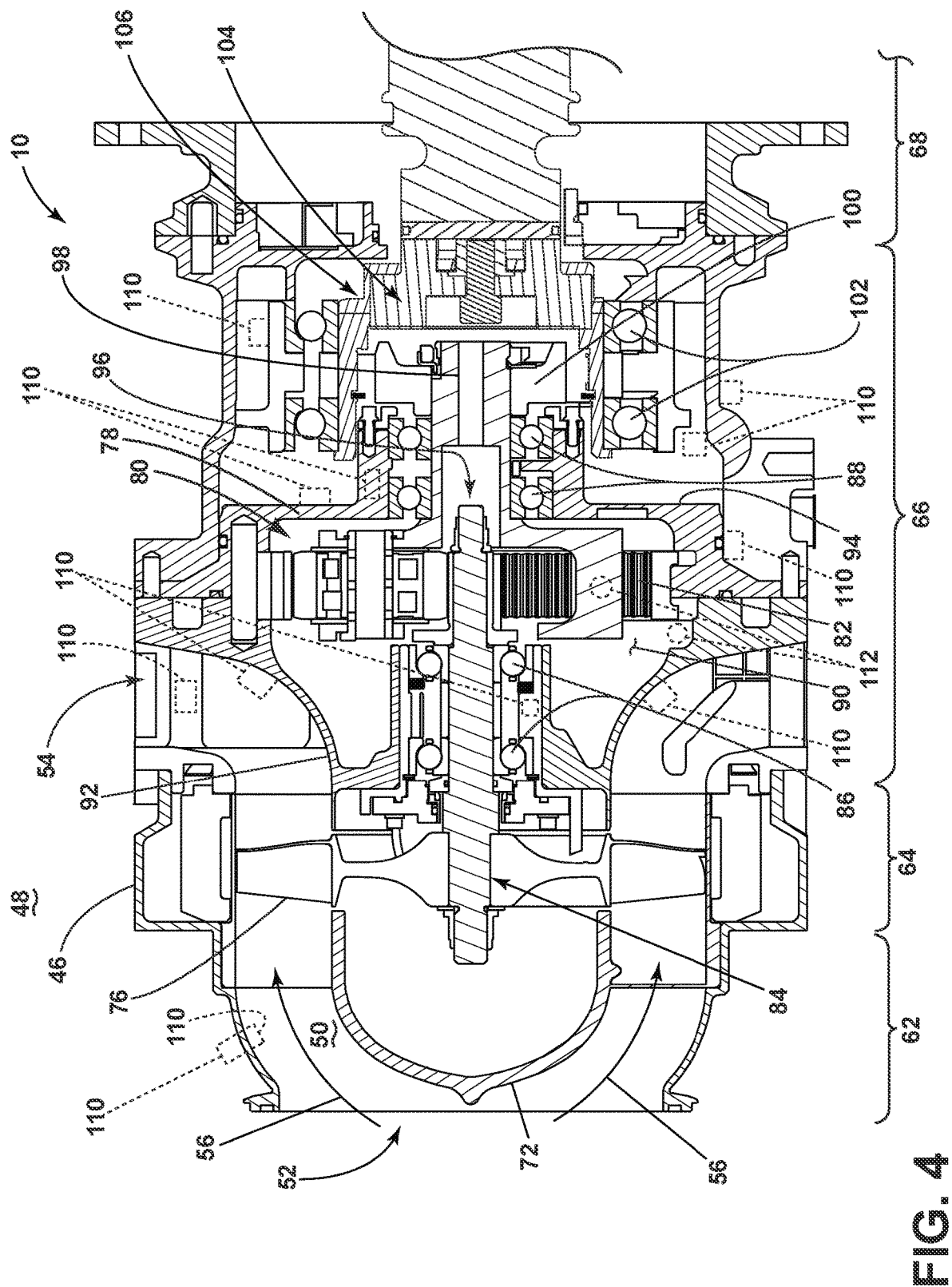
FIG. 4 is an enlarged cross-sectional view of the air turbine starter taken along line IV-IV of FIG. 3, and further illustrating a gearbox, in accordance with various aspects described herein.

FIG. 4 is a schematic cross section of the ATS 10 of FIG. 2 which shows the inlet assembly 62, the turbine section 64, and the gearing/clutch section 66 in greater detail. The inlet assembly 62 can include stationary portions 72 to guide air in the primary air flow path 56 and define at least a portion of the primary air flow path 56 from the primary inlet 52 to the turbine section 64. In one non-limiting example fluid or air is supplied to the primary air flow path 56 from either a ground-operating air cart, an auxiliary power unit, or a cross-bleed start from an engine already operating. The stationary portions 72 can couple to or be formed with the housing 46. Optionally, beams or other supports through which air can flow through or between can couple the stationary portions 72 to the housing 46.

The turbine section 64 of the ATS 10 includes a turbine member 76 within the housing 46 and disposed within the primary air flow path 56 for rotatably extracting mechanical power from the flow of gas along the primary air flow path 56.

The gearing/clutch section 66 can include a gearbox 78 mounted within the housing 46. Further, a gear train 80, disposed within the gearbox 78 and drivingly coupled with the turbine member 76, can be caused to rotate.

The gear train 80 includes a ring gear 82 and can further comprise any gear assembly including for example but not limited to a planetary gear assembly or a pinion gear assembly. A turbine shaft 84 couples the gear train 80 to the turbine member 76 allowing for the transfer of mechanical power to the gear train 80. The turbine shaft 84 is coupled to the gear train 80 and rotatably supported by a pair of turbine bearings 86. The gear train 80 is supported by a pair of carrier bearings 88. A gearbox interior 90 can contain a lubricant, including, but not limited to, a grease or oil to provide lubrication and cooling to mechanical parts contained therein such as the gear train 80, ring gear 82, and bearings 86, 88. The gearbox 78 can include an upstream portion 92 coupled to a downstream portion 94 that can define, at least in part, the gearbox interior 90. Alternatively, the gearbox 78 can include of any number of components or be formed with one or more portions of the housing 46. The gearbox 78 can fluidly isolate the gearbox interior 90 or the gear train 80 from one or more other components of the ATS 10.

There is an aperture 96 in the gearbox 78 or gearbox casing through which the turbine shaft 84 extends and meshes with a carrier shaft 98 to which a clutch 100 is mounted and supported by a pair of spaced bearings 102. A drive shaft 104 extends from the gearbox 78 and is coupled to the clutch 100 and additionally supported by the pair of spaced bearings 102. The drive shaft 104 is driven by the gear train 80 and coupled to the AGB 12, such that during a starting operation the drive shaft 104 provides a driving motion to the AGB 12.

The clutch 100 can be any type of shaft interface portion that forms a single rotatable shaft 106 comprising the turbine shaft 84, the carrier shaft 98, and the drive shaft 104. The shaft interface portion can be by any known method of coupling including, but not limited to, gears, splines, a clutch mechanism, or combinations thereof. An example of a shaft interface portion is disclosed in U.S. Pat. No. 4,281,942 to General Electric and is incorporated herein by reference in its entirety.

The rotatable shaft 106 can be constructed by any materials and methods, including, but not limited to extrusion or machining of high strength metal alloys such as those containing aluminum, iron, nickel, chromium, titanium, tungsten, vanadium, or molybdenum. The diameter of the turbine shaft 84, carrier shaft 98, and drive shaft 104 can be fixed or vary along the length of the rotatable shaft 106. The diameter can vary to accommodate different sizes, as well as rotor to stator spacing.

As described herein, air supplied along the primary air flow path 56 rotates the turbine member 76 for driving the rotation of the rotatable shaft 106. Therefore, during starting operations, the ATS 10 can be the driving mechanism for the turbine engine 14 via rotation of the rotatable shaft 106. The non-driving mechanism, that is, the equipment being driven by the driving mechanism, can be understood as rotating equipment utilizing the rotational movement of the rotatable shaft 106, for example to generate electricity in the ATS 10.

At least one starter sensor 110, can be located on or in the ATS 10 at any location that is separate, remote, or exterior of the gearbox 78. That is, the at least one starter sensor 110 can be located at any position on or in the ATS 10 that is fluidly isolated from the gearbox interior 90. By way of non-limiting example, the at least one starter sensor 110 can be located on the exterior 48 of the housing 46, the interior 50 of the housing 46, or extend from the exterior 48 of the housing 46 into the interior 50. By way of further non-limiting example, the at least one starter sensor 110 can be located within the primary air flow path 56 of the ATS 10, adjacent the clutch 100 or the pair of spaced bearings 102, or contained within a portion of the housing 46.

The at least one starter sensor 110 can be, by way of non-limiting example, at least one starter temperature sensor. The at least one starter temperature sensor can provide information related to, but is not limited to, the temperature of at least one component of the ATS 10 or the temperature of the air flowing through or surrounding one or more portions of the ATS 10. Additionally, or alternatively, the at least one starter sensor 110 can be an environmental starter sensor adapted to sense an environmental condition relative to the starter. The environmental sensor can be, by way of non-limiting example, a humidity sensor, global positioning system (GPS), pressure sensor, altimeter, ambient air temperature sensor, strain gauge, accelerometer, or photodetector.

Optionally, the ATS 10 can include at least one internal gearbox detector 112 that can be located within the gearbox 78. By way of non-limiting example, the at least one internal gearbox detector 112 can be located in the gearbox interior 90 and can be in fluid contact with the lubricant contained within the gearbox 78. By way of non-limiting example, the at least one internal gearbox detector 112 can detect be a fluid level in the gearbox 78, an oil film temperature, or other oil property.

Figure 5:
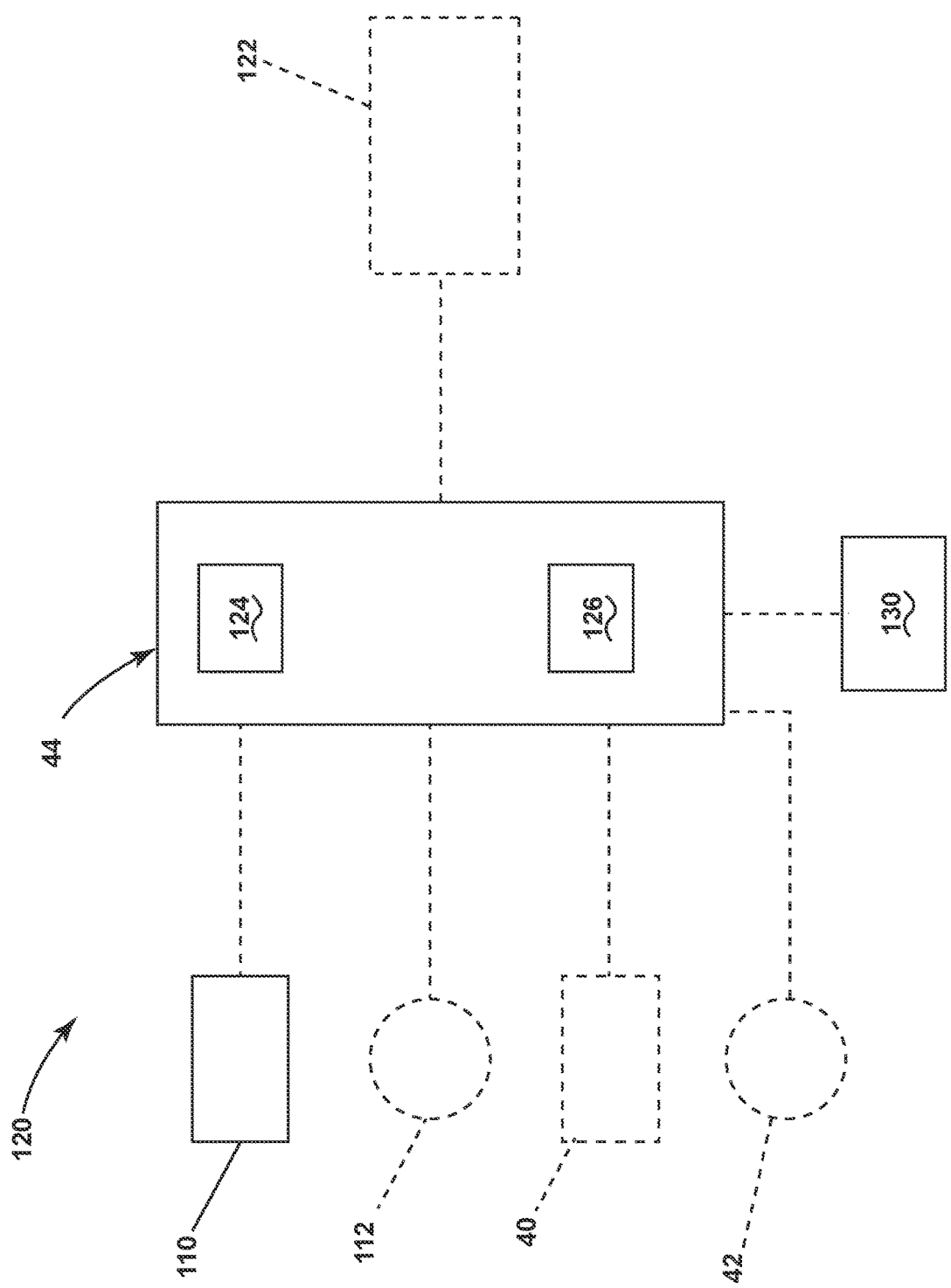
FIG. 5 is a schematic illustration of a system that can predict an oil life of oil in the gearbox of the air turbine starter of FIG. 3, in accordance with various aspects described herein.

FIG. 5 illustrates a system 120 for determining an oil quality for oil of the ATS 10. The system 120 can include the at least one starter sensor 110 in communication with the controller module 44. It is contemplated that the system 120 can include an output assembly 122. Optionally, the system 120 can include the at least one internal gearbox detector 112, the at least one aircraft sensor 40, the at least engine sensor 42, or a combination thereof.

The controller module 44 can include a processor 124 that can be in communication with a memory 126. The controller module 44 is configured to estimate a model of oil quality. That is, the controller module 44 uses information communicated to the controller module 44 or data stored in the memory 126 (or received from 110, 112, 40, 42) to generate, determine, calculate, produce, or the like, a model that estimates the oil quality of the oil in the gearbox 78 of the ATS 10. The estimated model of oil quality can be at least partially based on a sensed temperature communicated from the at least one starter sensor 110. The controller module 44 can, in response to the estimated model of oil quality, schedule a maintenance event. Optionally, the estimated model of oil quality or the schedule for the maintenance event can be communicated via the output assembly 122. The output assembly 122 can be coupled to or in communication with the controller module 44. The output assembly 122 can be a monitor, user interface, wireless device, speaker, or the like. While "estimation" of the model of oil quality is described, it is understood that the "estimation" can include determining, predicting, calculating, or the like, of the model of oil quality described herein.

The memory 126 can include configurational data. The configurational data can include, but is not limited to, type or model of the ATS 10, type or model of the turbine engine 14, installation date of the ATS 10, recent maintenance performed on ATS 10 or the turbine engine 14, or oil specific data. The oil specific data can include, by way of non-limiting example the oil type, amount of oil, oil mixture, viscosity of the oil, or a predetermined estimated model of oil quality for the oil in the gearbox 78 of the ATS 10.

The controller module 44 can be in communication with or part of a flight management system (FMS) 130. The FMS 130 can provide duty cycle data. The duty cycle data can include, but is not limited to, how long the ATS 10 ran during a startup cycle, the number of startup cycles the ATS has performed, how long the turbine engine 14 ran during a flight plan, the number or type of flight plans performed by the turbine engine 14, altitudes experienced by the turbine engine 14 or ATS 10, future startup cycles or flight plans predicted for the ATS 10 or the turbine engine 14, or environmental data based on flight plan, startup cycle, geographic location of the ATS 10 or the turbine engine 14, or altitude.

In operation, by way of non-limiting example, the at least one starter sensor 110 can be located in the primary air flow 56 or adjacent the gearbox 78 and can function as one or more temperature sensors. The at least one starter sensor 110 communicates with the controller module 44. Information communicated to the controller module 44 from the at least one starter sensor 110 can be processed by the controller module 44 or the controller module 44 to generate a temperature data set. Optionally, the temperature data set or a portion of the temperature data set can be generated from information communicated to the controller module 44 by the by the at least one aircraft sensor 40 or the at least engine sensor 42. That is, the generation of the temperature data set can be based on any number of temperature sensors external from the gearbox 78. The temperature data set can be stored in the memory 126 for access by the controller module 44. The temperature data set can include at least one value or range of values indicative or related to temperature. It is considered that the temperature data set can include data that corresponds to or provides information related to the temperature of oil in the ATS 10. It is further contemplated that the temperature data set can be obtained from one or more values collected before start-up, during operation, after use, or any combination therein of the ATS 10 or the engine 14. The values collected can be included, but are not limited to, any one or combination of a directly measured temperature, a time at each temperature, a minimum temperature, a maximum temperature, a mean temperature, or a rate of change of the temperature. The temperature data set can be specific to each ATS. Alternatively, the temperature data set can include temperature data or models communicated from other air turbine starters.

The at least one starter sensor 110 coupled to the exterior 48 of the housing 46 of the ATS 10 can function as an environmental sensor and is adapted to sense an environmental condition relative to the ATS 10. By way of non-limiting example, the environmental condition can be at least one of an ambient temperature during aircraft takeoff, average of ambient air temperatures during takeoff, average cruising altitudes, maximum altitude during flight, a geographic location of aircraft takeoff, an ambient temperature at take-off, or an ambient temperature during an aircraft cruising phase. Optionally, an environmental data set or a portion of an environmental data set can be generated from information communicated to the controller module 44 by the by the at least one aircraft sensor 40, the at least engine sensor 42, of the FMS 130. That is, the generation of the environmental data set can be based on any number of environmental sensors external from the gearbox 78. Optionally, the environmental data set can stored in the memory 126 for access by the controller module 44. The environmental data set can include at least one value or range of values indicative or related to temperature.

The controller module 44 can predict the remaining oil life based on at least one of the temperature data set, the environmental data set, a combination thereof, or the like. The prediction of the remaining oil life can be based on the dynamic or the predetermined estimated models of oil quality developed or compared with the temperature data set and the environmental data set. By way of non-limiting example, the controller module 44 can use a physics-based analysis or simulation, or a combination thereof to dynamically generate the estimated model of oil quality that considers the ambient temperature during aircraft takeoff, the geographic location of aircraft takeoff, the ambient temperature at take-off, the ambient temperature during an aircraft cruising phase to estimate the model of oil quality, or a combination thereof. Additionally, or alternatively, to predicting the remaining oil life, the estimated model of oil quality can provide or be used to determine an oil quality value. The oil quality value can then be compared to a predetermined threshold or predetermined range.

It is important to note that the remaining oil life or the oil quality value is not based on direct sensing of the temperature of the gearbox interior 90 of the gearbox 78 or direct sensing of the oil parameters. That is, the remaining oil life or the oil quality value is not based on measurements from the at least one internal gearbox detector 112.

Additionally, or alternatively, the prediction of the remaining oil life or oil quality value can be based on information stored in the memory 126 or otherwise accessible by the controller module 44. By way of non-limiting example, the remaining oil life or the oil quality value can be determined by a table comparison between the temperature data set and the environmental data set and one or more tables accessible by the controller module 44 of the system 120.

It is considered that an operational data set can obtained by the controller module 44. The operational data can be generated based on data indicative of air turbine starter starting operations. The operational data can include at least one of a total number of cycles the air turbine starter has performed, a number of rotations per minute (RPM) of a starting operation, or a time value reflecting a length of time the air turbine starter has operated in at least one starting operation such as duration of air starter operation. The operational data set can be obtained, determined, or generated by the at least one starter sensor 110, the at least engine sensor 42, the memory 126, the FMS 130, input from a user, or a combination thereof. Optionally, the operational data can include data obtained by the at least one internal gearbox detector 112. The information from the at least one internal gearbox detector 112 can be, for example, an oil level at startup. However, it is considered that the operational data set can be predicted without the use of the at least one internal gearbox detector 112.

It is further considered that in addition to or an alternative of obtaining operational data, the controller module 44 can obtain air turbine starter configuration data. The air turbine starter configuration data includes at least one of type or model of the ATS 10, type or model of the turbine engine 14, installation or last oil change date of the ATS 10, recent maintenance performed on the ATS 10 or the turbine engine 14, or oil specific data. The oil specific data can include, by way of non-limiting example the oil type, amount of oil, oil mixture, viscosity of the oil, or the predetermined estimated model of oil quality for the oil in the gearbox 78 of the ATS 10. The air turbine starter configuration data can be obtained, determined, or generated by the at least one starter sensor 110, the at least one aircraft sensor 40, the at least engine sensor 42, the memory 126, the FMS 130, or input from a user. Optionally, the air turbine starter configuration data can include data obtained by the at least one internal gearbox detector 112. However, it is considered that the air turbine starter configuration data can be obtained without the use of the at least one internal gearbox detector 112.

Optionally, the estimated model of oil quality, the oil quality value, or the remaining oil life estimated or determined by the controller module 44 can be used to determine an ATS life. The ATS life can be a number of cycles, number of miles, number of run hours, number of weeks, or percentage of the total ATS life that can occur before the ATS 10 will fall below a predetermined performance threshold. The estimated model of oil quality, an oil quality value, the remaining oil life, or the ATS life can be communicated by the output assembly 122.

The starting cycle of operation of the ATS 10 can be selected by the controller module 44 based on the estimated model of oil quality, the oil quality value, the remaining oil life, or the ATS 10. The operating cycle can be selected based on the values or based on comparing the estimated model of oil quality, the oil quality value, the remaining oil life, or the ATS 10 to predetermined thresholds or ranges of values. It is contemplated that the processor 124 or the controller module 44 are imbedded with the control system of the ATS 10.

A maintenance event can be scheduled in response to the estimated model of oil quality, an oil quality value, the remaining oil life, or the ATS life being compared to a threshold value such as an oil quality threshold value, a threshold remaining oil life value, or a threshold ATS life value. That is, a maintenance event can be scheduled in response to satisfying a comparison. The comparison can be that the oil quality value, the remaining oil life, or the ATS life falls within a range determined by or a percentage of the respective threshold value(s). The comparison can further include the oil quality value, the remaining oil life, or the ATS life being greater than, equal to, or less than the respective threshold value(s). The maintenance event, by way of non-limiting example, can be replacement of the ATS 10 or replacement of the oil in the gearbox 78 of the ATS 10. Optionally, the maintenance event or schedule can be communicated by the output assembly 122. In one non-limiting example, the results of scheduling the maintenance request can include performing the maintenance, taking the ATS 10 out of service, or the like.

Figure 6:
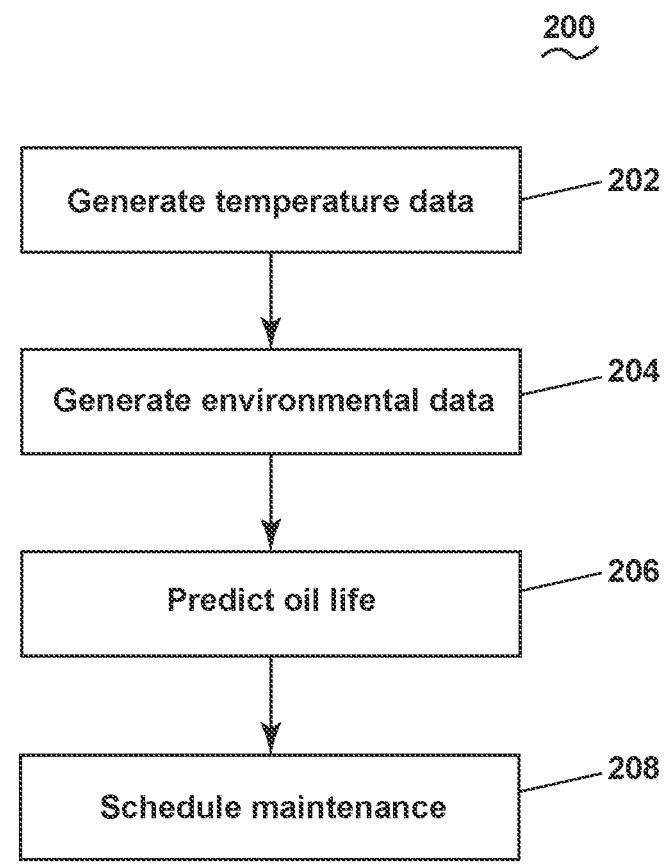
FIG. 6 is a flow chart illustrating a method for predicting an oil life of oil in the gearbox using the system of FIG. 5, in accordance with various aspects described herein.

FIG. 6 illustrate a method 200 for predicting a remaining oil life of oil in the gearbox 78 of the ATS 10. At 202, the temperature data set is generated by sensing a temperature from a temperature sensor external of the gearbox 78. The temperature sensor external of the gearbox 78 used to generate the temperature data set can be one of the at least one starter sensor 110. Additionally, or alternatively, the temperature data set can be generated, at least in part, by the at least one aircraft sensor 40 or the at least engine sensor 42. At 204, the environmental data set is generated by an environmental sensor, the environmental sensor adapted to sense an environmental condition relative to the ATS 10. The environmental sensor can be one of the at least one starter sensor 110. Additionally, or alternatively, the environmental data set can be generated, at least in part, by the at least one aircraft sensor 40, the at least engine sensor 42, or the FMS 130. At 206, the controller module 44 predicts a remaining oil life based on the temperature data set and the environmental data set. At 208, a maintenance event is scheduled in response to the prediction of the remaining oil life.

That is, at 202, the temperature data set can be generated by data, signals, or information otherwise provided to the controller module 44 by the at least one starter sensor 110 located in the primary air flow 56 or adjacent the gearbox 78. The data, signals, or information otherwise communicated to the controller module 44 from the at least one starter sensor 110 can be processed by the controller module 44 to generate the temperature data set. Optionally, the temperature data set or a portion of the temperature data set can be generated from information communicated to the controller module 44 by the by the at least one aircraft sensor 40 or the at least engine sensor 42. That is, the generation of the temperature data set can be based on any number of temperature sensors external from the gearbox 78. The temperature data set can stored in the memory 126 for access by the controller module 44.

At 204, the at least one starter sensor 110 coupled to the exterior 48 of the housing 46 of the ATS 10 can function as an environmental sensor and is adapted to sense an environmental condition relative to the ATS 10. By way of non-limiting example, the environmental condition can be at least one of an ambient temperature during aircraft takeoff, average of ambient air temperatures during takeoff, average cruising altitudes, maximum altitude during flight, a geographic location of aircraft takeoff, an ambient temperature at take-off, or an ambient temperature during an aircraft cruising phase. Optionally, the environmental data set or a portion of the environmental data set can be generated from information communicated to the controller module 44 by the by the at least one aircraft sensor 40, the at least engine sensor 42, of the FMS 130. That is, the generation of the environmental data set can be based on any number of environmental sensors external from the gearbox 78. Optionally, the environmental data set can stored in the memory 126 for access by the controller module 44.

At 206, the controller module 44 can predict the remaining oil life based on the temperature data set and the environmental data set. The prediction of the remaining oil life can be based on or in addition to the estimated model of oil quality estimated by or accessed by the controller module 44 of the system 120. The estimated model of oil quality can provide or be otherwise used to determine an oil quality value.

At 208 one or more maintenance events can be scheduled in response to the dynamic estimated model of oil quality, an oil quality value, the remaining oil life, or the ATS life being compared to a threshold value such as an oil quality threshold value, a threshold remaining oil life value, a threshold ATS life value or a predetermined estimated model of oil quality. That is, a maintenance event can be scheduled in response to satisfying a comparison. The comparison can be that the oil quality value, the remaining oil life, or the ATS life falls within a range determined by or a percentage of the respective threshold value(s). The comparison can further include the oil quality value, the remaining oil life, or the ATS life being greater than, equal to, or less than the respective threshold value(s). It is contemplated that the comparison can be the difference or other variance between the dynamic estimated model for oil quality and the predicted estimated model for oil quality. The maintenance event, by way of non-limiting example, can be replacement of the ATS 10 or replacement of the oil in the gearbox 78 of the ATS 10. Optionally, the maintenance event or schedule can be communicated by the output assembly 122.

Figure 7:
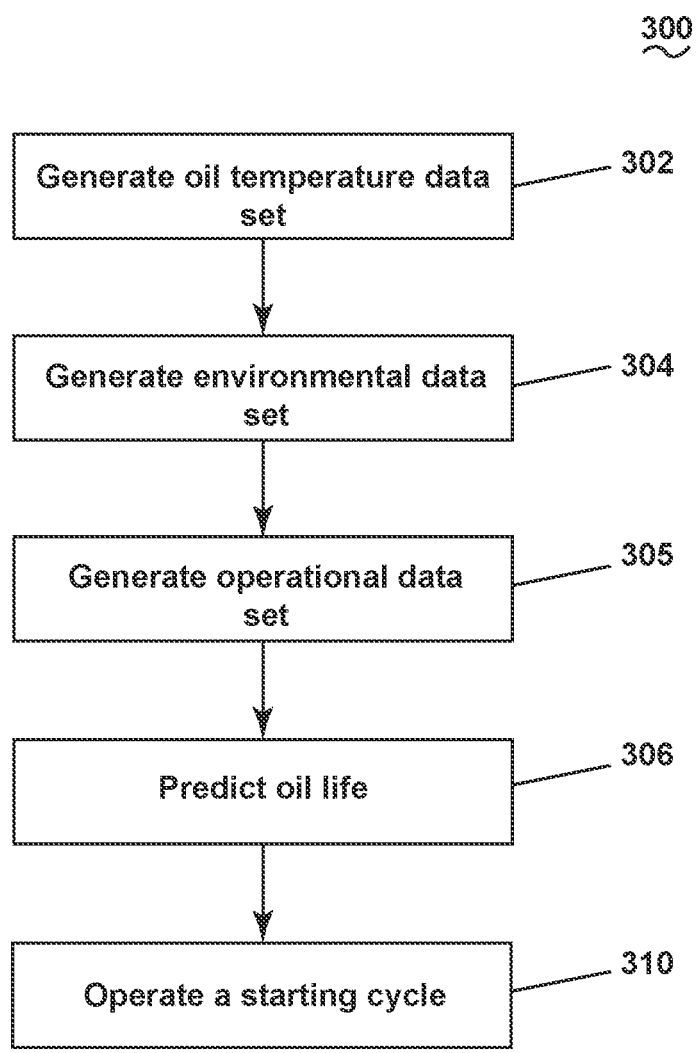
FIG. 7 is a flow chart illustrating another method for predicting oil life, in accordance with various aspects described herein.

FIG. 7 illustrates another method 300 for predicting the oil life in the gearbox 78 of the ATS 10. The method 300 is similar to the method 200 where like steps are increased in value by 100.

At 302, an oil temperature data set is generated by sensing a temperature from a temperature sensor external of the gearbox 78. The temperature sensor external of the gearbox 78 used to generate the temperature data set can be one of the at least one starter sensor 110. Additionally, or alternatively, the temperature data set can be generated, at least in part, by the at least one aircraft sensor 40 or the at least engine sensor 42. The temperature data set can be indicative of a temperature of oil within the gearbox 78.

At 304, an environmental data set is generated by an environmental sensor, the environmental sensor adapted to sense an environmental condition relative to the ATS 10. The environmental sensor can be one of the at least one starter sensor 110. Additionally, or alternatively, the environmental data set can be generated, at least in part, by the at least one aircraft sensor 40, the at least engine sensor 42, or the FMS 130.

At 305, an operational data set is obtained by the controller module 44. The operational data can be generated based on data indicative of air turbine starter starting operations. The operational data can include at least one of a total number of cycles the air turbine starter has performed, a number of rotations per minute (RPM) of a starting operation, or a time value reflecting a length of time the air turbine starter has operated in at least one starting operation such as duration of air starter operation. The operational data set can be obtained, determined, or generated by the at least one starter sensor 110, the at least engine sensor 42, the memory 126, the FMS 130, or input from a user. Optionally, the operational data can include data obtained by the at least one internal gearbox detector 112. The information from the at least one internal gearbox detector 112 can be, for example, an oil level at startup. However, it is considered that the operational data set can be predicted without the use of the at least one internal gearbox detector 112.

In addition to or an alternative of obtaining operational data at 305, the controller module 44 can obtain air turbine starter configuration data. The air turbine starter configuration data includes at least one of type or model of the ATS 10, type or model of the turbine engine 14, installation or last oil change date of the ATS 10, recent maintenance performed on the ATS 10 or the turbine engine 14, or oil specific data. The oil specific data can include, by way of non-limiting example the oil type, amount of oil, oil mixture, viscosity of the oil, or the predetermined estimated model of oil quality for the oil in the gearbox 78 of the ATS 10. The air turbine starter configuration data can be obtained, determined, or generated by the at least one starter sensor 110, the at least one aircraft sensor 40, the at least engine sensor 42, the memory 126, the FMS 130, or input from a user. Optionally, the air turbine starter configuration data can include data obtained by the at least one internal gearbox detector 112. However, it is considered that the air turbine starter configuration data can be obtained without the use of the at least one internal gearbox detector 112.

At 306, the controller module 44 predicts a remaining oil life, an ATS life, an oil quality value, or estimates a model of oil quality based on the temperature data set, the environmental data set, and the operation data set or the air turbine starter configuration data. Optionally, the prediction of the remaining oil life can include data obtained by the at least one internal gearbox detector 112. However, it is considered that the remaining oil life can be predicted without the use of the at least one internal gearbox detector 112.

At 310, operation of a starting cycle of the ATS 10 can be based on the predicted remaining oil life, the ATS life, the oil quality value, or estimated model of oil quality.

Optionally, the method 300 can further include scheduling a maintenance event in response to the prediction of the remaining oil life, the ATS life, the oil quality value, or estimated model of oil quality or the comparing of the aforementioned values to corresponding threshold vales or ranges similar to step 208.

Benefits associated with the disclosure discussed herein includes predicting the remaining oil life without having to directly sense the temperature of the interior of the gearbox or directly sense oil parameters. Instead, sensors remote or exterior of the gearbox provide information need to estimate oil parameters such as remaining oil life.

Additional benefits include improved operation. The starting cycle of the air turbine starter can be based on the predicted remining oil life.

Further, a maintenance event can be scheduled or a schedule can be predicted for maintenance that considers each cycle of operation and can adjust the remaining oil life accordingly. Specifically, considering environmental data for the environment in which the air turbine starter is operating.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. A method for predicting a remaining oil life of oil in a gearbox of an air turbine starter of a vehicle, the method including generating a temperature data set by sensing a temperature from at least one temperature sensor external of the gearbox, generating an environmental data set by an environmental sensor, the environmental sensor adapted to sense an environmental condition relative to the air turbine starter, predicting, by a controller module, a remaining oil life based on the temperature data set and the environmental data set, and scheduling a maintenance event in response to the prediction of the remaining oil life.

2. The method of clause 1 wherein the at least one temperature sensor couples to a housing of the air turbine starter.

3. The method of any preceding clause wherein the at least one temperature sensor is located in a primary air flow path of the air turbine starter.

4. The method of any preceding clause wherein the environmental condition is at least one of an ambient temperature during aircraft takeoff, a geographic location of aircraft takeoff, or an ambient temperature during an aircraft cruising phase.

5. The method of any preceding clause, further comprising generating, by the air turbine starter, operational data indicative of air turbine starter starting operations, and predicting the remaining oil life based further on the operational data.

6. The method of any preceding clause, wherein the operational data includes at least one of a total number of cycles the air turbine starter has performed, a number of rotations per minute (RPM) of a starting operation, or a time value reflecting a length of time the air turbine starter has operated in at least one starting operation.

7. The method of any preceding clause, further comprising predicting the remaining oil life based on air turbine starter configuration data.

8. The method of any preceding clause, wherein the air turbine starter configuration data includes at least one of an oil type or oil specific data.

9. The method of any preceding clause, further comprising comparing the prediction of the remaining oil life with a threshold oil life value, and scheduling a maintenance event in response to satisfying the comparison.

10. The method of any preceding clause wherein predicting the remaining oil life is not based on direct sensing of the temperature of the gearbox or direct sensing of oil parameters.

11. A system for determining an oil quality for oil of an air turbine starter that includes at least one temperature sensor adapted to sense a temperature external of a gearbox, and a controller module configured to estimate a model of oil quality based on the sensed temperature, and to schedule a maintenance event in response to the estimated model of oil quality.

12. The system of any preceding clause wherein the oil is contained in the gearbox of the air turbine starter.

13. The system of any preceding clause wherein the air turbine starter life is based on the oil quality satisfying an oil quality threshold value.

14. The system of any preceding clause wherein the at least one temperature sensor is located in a primary air flow path of the air turbine starter.

15. The system of any preceding clause wherein the temperature sensor is located on an exterior of a housing of the air turbine starter.

16. The system of any preceding clause, wherein the controller module is further configured to estimate the model of oil quality based on at least one of an ambient temperature during aircraft takeoff, a geographic location of aircraft takeoff, an ambient temperature at take-off, or an ambient temperature during an aircraft cruising phase.

17. The system of any preceding clause, wherein the controller module is further configured to estimate the model of oil quality based on operational data indicative of air turbine starter starting operations.

18. A method for predicting a remaining oil life in a gearbox of an air turbine starter, the method including generating an oil temperature data set by sensing a temperature, from a temperature sensor external of the gearbox, that is indicative of a temperature of the oil within the gearbox, generating an environmental data set comprising at least one of average ambient air temperatures during takeoff or average cruising altitudes, generating an operational data set comprising at least one of total number of starting cycles for the starter, rpm during starting, or duration of air starter operation, predicting a remaining oil life by inputting the oil temperature, environmental, and operational data sets, along with an oil type, into a controller module, and operating a starting cycle of the air turbine starter based on the predicted remaining oil life.

19. The method of any preceding clause wherein the temperature sensor is one of at least an aircraft temperature sensor or an engine temperature sensor.

20. The method of any preceding clause, further comprising comparing the predicted remaining oil life with a threshold remaining oil life value, and scheduling a maintenance event in response to satisfying the comparison.

What is claimed is:

1. A method for predicting a remaining oil life of oil in a gearbox of an air turbine starter of a vehicle, the method comprising:
   generating a temperature data set by sensing a temperature from at least one temperature sensor external of the gearbox;
   generating an environmental data set by an environmental sensor, the environmental sensor adapted to sense an environmental condition relative to the air turbine starter;
   predicting, by a controller module, a remaining oil life based on the temperature data set and the environmental data set, wherein predicting the remaining oil life is not based on direct sensing within an interior of the gearbox; and
   scheduling a maintenance event in response to the prediction of the remaining oil life.

2. The method of claim 1, wherein the at least one temperature sensor is located in a primary air flow path of the air turbine starter.

3. The method of claim 2, wherein the environmental condition is at least one of an ambient temperature during aircraft takeoff, a geographic location of aircraft takeoff, or an ambient temperature during an aircraft cruising phase.

4. The method of claim 1, further comprising generating, by the air turbine starter, operational data indicative of air turbine starter starting operations, and predicting the remaining oil life based further on the operational data.

5. The method of claim 4, wherein the operational data includes at least one of a total number of cycles the air turbine starter has performed, a number of rotations per minute (RPM) of a starting operation, or a time value reflecting a length of time the air turbine starter has operated in at least one starting operation.

6. The method of claim 1, further comprising predicting the remaining oil life based on air turbine starter configuration data.

7. The method of claim 6, wherein the air turbine starter configuration data includes at least one of an oil type or oil specific data.

8. The method of claim 1, further comprising comparing the prediction of the remaining oil life with a threshold oil life value, and scheduling the maintenance event in response to satisfying the comparison.

9. The method of claim 1, wherein predicting the remaining oil life is not based on direct sensing of a temperature of the gearbox or direct sensing of oil parameters.

10. The method of claim 1, wherein the environmental sensor is located external of the gearbox.

11. A method for predicting a remaining oil life of oil in a gearbox of an air turbine starter of a vehicle, the method comprising:
    generating a temperature data set by sensing a temperature from at least one temperature sensor external of the gearbox, wherein the at least one temperature sensor is located in a primary air flow path and couples to a housing of the air turbine starter;
    generating an environmental data set by an environmental sensor, the environmental sensor adapted to sense an environmental condition relative to the air turbine starter;
    predicting, by a controller module, a remaining oil life based on the temperature data set and the environmental data set; and
    scheduling a maintenance event in response to the prediction of the remaining oil life.

12. The method of claim 11, further comprising generating, by the air turbine starter, operational data indicative of air turbine starter starting operations, and predicting the remaining oil life based further on the operational data.

13. The method of claim 11, wherein the environmental condition is at least one of an ambient temperature during aircraft takeoff, a geographic location of aircraft takeoff, or an ambient temperature during an aircraft cruising phase.

14. The method of claim 11, wherein predicting the remaining oil life is not based on direct sensing of a temperature of the gearbox or direct sensing of oil parameters.

15. A method for predicting a remaining oil life of oil in a gearbox of an air turbine starter of a vehicle, the method comprising:
    generating a temperature data set by sensing a temperature from at least one temperature sensor external of the gearbox;
    generating an environmental data set by an environmental sensor, the environmental sensor adapted to sense an environmental condition relative to the air turbine starter, wherein the environmental condition is at least one of an ambient temperature during aircraft takeoff, a geographic location of aircraft takeoff, or an ambient temperature during an aircraft cruising phase;
    predicting, by a controller module, a remaining oil life based on the temperature data set and the environmental data set; and
    scheduling a maintenance event in response to the prediction of the remaining oil life.

16. The method of claim 15, wherein the at least one temperature sensor couples to a housing of the air turbine starter.

17. The method of claim 15, further comprising generating, by the air turbine starter, operational data indicative of air turbine starter starting operations, and predicting the remaining oil life based further on the operational data.

18. The method of claim 17, wherein the operational data includes at least one of a total number of cycles the air turbine starter has performed, a number of rotations per minute (RPM) of a starting operation, or a time value reflecting a length of time the air turbine starter has operated in at least one starting operation.

19. The method of claim 15, further comprising predicting the remaining oil life based on air turbine starter configuration data.

* * * * *